(12) United States Patent
Lebeck et al.

(10) Patent No.: US 10,140,464 B2
(45) Date of Patent: Nov. 27, 2018

(54) METHODS AND SYSTEMS FOR PROVIDING PRESENTATION SECURITY FOR AUGMENTED REALITY APPLICATIONS

(71) Applicant: University of Washington, Seattle, WA (US)

(72) Inventors: Kiron Lebeck, Seattle, WA (US); Tadayoshi Kohno, Seattle, WA (US); Franziska Roesner, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 15/373,296

(22) Filed: Dec. 8, 2016

(65) Prior Publication Data

US 2017/0162177 A1 Jun. 8, 2017

Related U.S. Application Data

(60) Provisional application No. 62/264,729, filed on Dec. 8, 2015.

(51) Int. Cl.
*G06F 3/14* (2006.01)
*G09G 5/00* (2006.01)
(Continued)

(52) U.S. Cl.
CPC ............ *G06F 21/6218* (2013.01); *G06F 3/14* (2013.01); *G06T 19/006* (2013.01); *G09G 5/00* (2013.01);
(Continued)

(58) Field of Classification Search
None
See application file for complete search history.

(56) References Cited

U.S. PATENT DOCUMENTS 6,738,040 B2  5/2004  Jahn et al.
8,164,543 B2  4/2012  Seder et al.
(Continued)

OTHER PUBLICATIONS

ABI Research, "ABI Research Shows Augmented Reality on the Rise With Total Market Worth to Reach $100 Billion by 2020," Nov. 19, 2015, <https://www.abiresearch.com/press/abi-research-shows-augmented-reality-rise-total-ma/> [retrieved Mar. 2017], 2 pages.
(Continued)

*Primary Examiner* — Kee M Tung
*Assistant Examiner* — Yanna Wu
(74) *Attorney, Agent, or Firm* — Christensen O'Connor Johnson Kindness PLLC

(57) ABSTRACT

In some embodiments, an augmented reality system is provided that provides output security. In some embodiments, an operating system of the augmented reality system provides trusted management support for presenting virtual objects from untrusted applications executing in multiple isolated processes. With the output security mechanisms enabled, untrusted applications are still provided significant flexibility to create immersive AR experiences, but their presented content is constrained by the augmented reality system based on one or more output policies that are intended to reduce intrusiveness of virtual object presentations. Output policies may be composable, such that more than one output policy may be enforced on a given virtual object in a way that reduces intrusiveness of the presentation of the virtual object.

9 Claims, 9 Drawing Sheets

(51) Int. Cl.
    G06F 21/62    (2013.01)
    G06T 19/00    (2011.01)
(52) U.S. Cl.
    CPC ............... G09G 2340/0407 (2013.01); G09G
              2340/0464 (2013.01); G09G 2340/10
           (2013.01); G09G 2340/12 (2013.01); G09G
           2340/14 (2013.01); G09G 2380/10 (2013.01)

(56)                References Cited

U.S. PATENT DOCUMENTS

| | | | |
|---|---|---|---|
| 8,264,505 | B2 | 9/2012 | Bathiche et al. |
| 2012/0007852 | A1 | 1/2012 | Morate et al. |
| 2013/0249942 | A1 | 9/2013 | Green et al. |
| 2014/0192084 | A1 | 7/2014 | Latta et al. |
| 2015/0071555 | A1 | 3/2015 | D'Antoni et al. |
| 2016/0049013 | A1 | 2/2016 | Bautista |
| 2016/0350978 | A1* | 12/2016 | Mount ................. G06T 19/006 |
| 2016/0370855 | A1* | 12/2016 | Lanier .................. H04N 5/335 |

OTHER PUBLICATIONS

Azuma, R., et al., "Recent Advances in Augmented Reality," IEEE Computer Graphics and Applications 21(6):34-47, Nov.-Dec. 2001.
Azuma, R.T., et al., "A Survey of Augmented Reality," Presence: Teleoperators and Virtual Environments 6(4):355-385, Aug. 1997.
Baldwin, R., "Mini's Weird-Looking AR Goggles Are Actually Useful," Engadget, Apr. 22, 2015, <http://www.engadget.com/2015/04/22/bmw-mini-qualcomm-ad> [retrieved Mar. 2017], 13 pages.
Butz, A., et al., "Enveloping Users and Computers in a Collaborative 3D Augmented Reality," Proceedings of the 2nd IEEE and ACM International Workshop on Augmented Reality (IWAR '99), Article No. 35, San Francisco, Oct. 20-21, 1999, 10 pages.
Continental Automotive Global, "Augmented Reality Head-up Display—Continental," Aug. 7, 2014, video file, retrieved from <https://www.youtube.com/watch?v=3uuQSSnO7IE> [retrieved Mar. 22, 2017], 3 pages.
Costanza, E., et al., "Mixed Reality: A Survey," in Lalanne, D., and J. Kohlas (eds.), "Human Machine Interaction," Springer-Verlag: Berlin-Heidelberg, vol. 5440, 2009, pp. 47-68.
D'Antoni, D., et al., "Operating System Support for Augmented Reality Applications," Proceedings of the 14th Workshop on Hot Topics in Operating Systems (HotOS XIV), Paper No. 21, Santa Ana Pueblo, N.M., May 13-15, 2013, pp. 1-7.
Epstein, J., et al., "Evolution of a Trusted B3 Window System Prototype," Proceedings of the IEEE Symposium on Security and Privacy, Oakland, Calif., May 4-6, 1992, pp. 226-239.
Gansel, S., et al., "An Access Control Concept for Novel Automotive HMI Systems," Proceedings of the 19th ACM Symposium on Access Control Models and Technologies (SACMAT '14), London, Ontario, Canada, Jun. 25-27, 2014, pp. 17-28.
Greenberg, S., et al., "Dark Patterns in Proxemic Interactions: A Critical Perspective," Proceedings of the Conference on Designing Interactive Systems (DIS '14), Vancouver, B.C., Canada, Jun. 21-25, 2014, pp. 523-532.
Haeuslschmid, R., et al., "A Design Space to Support the Development of Windshield Applications for the Car," Proceedings of the CHI Conference on Human Factors in Computing Systems, Santa Clara, Calif., May 7-12, 2016, pp. 5076-5091.
Jana, S., et al., "Enabling Fine-Grained Permissions for Augmented Reality Applications With Recognizers," Proceedings of the 22nd USENIX Conference on Security, Washington, D.C., Aug. 14-16, 2013, pp. 415-430.
Jana, S., et al., "A Scanner Darkly: Protecting User Privacy From Perceptual Applications," Proceedings of the IEEE Symposium on Security and Privacy, San Francisco, May 19-22, 2013, pp. 349-363.
Kelley Blue Book, "Hyundai Augmented Reality Demonstration—CES 2015," Jan. 14, 2015, video file, retrieved from <https://www.youtube.com/watch?v=iZg89ov75QQ> [retrieved Mar. 22, 2017], 3 pages.

Lebeck, K., et al., "How to Safely Augment Reality: Challenges and Directions," Proceedings of the 17th International Workshop on Mobile Computing Systems and Applications (HotMobile '16), St. Augustine, Fla., Feb. 23-24, 2016, pp. 45-50.
Livingston, M.A., et al., "Military Applications of Augmented Reality," in B. Furht (ed.), "Handbook of Augmented Reality," Springer, New York, 2011, pp. 671-706.
MacIntyre, B., et al., "DART: A Toolkit for Rapid Design Exploration of Augmented Reality Experiences," Proceedings of the 17th Annual ACM Symposium on User Interface Software and Technology, Santa Fe, N.M., Oct. 24-27, 2004, pp. 197-206.
Mathews, L., et al., "Microsoft's HoloLens Demo Steals the Show at Build 2015," Geek.com, Apr. 30, 2015, <http://www.geek.com/microsoft/microsofts-hololens-demo-steals-the-show-at-build-2015-1621727/> [retrieved Mar. 22, 2017], 4 pages.
May, M., "Augmented Reality in the Car Industry," CompleteCar.ie, Aug. 1, 2015, <https://www.linkedin.com/pulse/augmented-reality-car-industry-melanie-may> [retrieved Mar. 22, 2017], 6 pages.
Meta Company, "Metal Development Kit," Metavision, <https://www.metavision.com> [retrieved Mar. 22, 2017], 9 pages.
Microsoft, "Microsoft HoloLens Commercial," <https://www.microsoft.com/microsoft-hololens/en-us/commercial> [retrieved Mar. 22, 2017], 7 pages.
Microsoft, "Microsoft HoloLens," <https://www.microsoft.com/microsoft-hololens/en-us> [retrieved Mar. 22, 2017], 9 pages.
Mizokama, K., "The F-35's $400,000 Third-Generation 'Magic' Helmet Is Here," Popular Mechanics, Mar. 4, 2016, <http://www.popularmechanics.com/military/weapons/news/a19764/the-f-35s-third-generation-magic-helmet-is-here/> [retrieved Mar. 22, 2017], 8 pages.
Naraine, R., "Windows XP SP2 Turns 'On' Pop-up Blocking," InternetNews.com, Mar. 18, 2004, <http://www.internetnews.com/dev-news/article.php/3327991> [retrieved Mar. 22, 2017], 8 pages.
Ng-Thow-Hing, V., et al., "User-Centered Perspectives for Automotive Augmented Reality," 2013 IEEE International Symposium on Mixed and Augmented Reality—Arts, Media, and Humanities (ISMAR-AMH), Adelaide, S.A., Australia, Oct. 1-4, 2013, pp. 13-22.
Papagiannakis, G., et al., "A Survey of Mobile and Wireless Technologies for Augmented Reality Systems," Computer Animation and Virtual Worlds 19(1):3-22, Feb. 2008.
Raval, N., et al., "MarkIt: Privacy Markers for Protecting Visual Secrets," Proceedings of the ACM International Joint Conference on Pervasive and Ubiquitous Computing: Adjunct Publication (UbiComp '14 Adjunct), Seattle, Sep. 13-17, 2014, pp. 1289-1295.
Roesner, F., and T. Kohno, "Securing Embedded User Interfaces: Android and Beyond," Proceedings of the 22nd USENIX Conference on Security (SEC'13), Washington, D.C., Aug. 14-16, 2013, pp. 97-112.
Roesner, F., et al., "Security and Privacy for Augmented Reality Systems," Communications of the ACM 57(4):88-96, Apr. 2014.
Roesner, F., et al., "World-Driven Access Control for Continuous Sensing," Proceedings of the ACM SIGSAC Conference on Computer and Communications Security (CCS '14), Scottsdale, Arizona, Nov. 3-7, 2014, pp. 1169-1181.
Rosenblum, A., "Augmented Reality Glasses Are Coming to the Battlefield," Popular Science, Apr. 22, 2015, <http://www.popsci.com/experimental-ar-glasses-offer-marines-hands-free-intel> [retrieved Mar. 22, 2017], 9 pages.
Schmalstieg, D., et al., "The Studierstube Augmented Reality Project," Presence: Teleoperators and Virtual Environments 11(1):33-54, Feb. 2002.
Shapiro, J.S., et al., "Design of the EROS Trusted Window System," Proceedings of the 13th Conference on USENIX Security Symposium (SSYM'04), San Diego, Aug. 9-13, 2004, vol. 13, Paper No. 12, pp. 1-15.
Sutherland, I.E., "A Head-Mounted Three Dimensional Display," Proceedings of the Dec. 9-11, 1968, Fall Joint Computer Conference, Part I (AFIPS '68), San Francisco, Dec. 9-11, 1968, pp. 757-764.
Tarantola, A., "HoloLens 'Project XRay' Lets You Blast Robot Armies With a Ray Gun Fist," Engadget, Oct. 6, 2015, <http://

(56) References Cited

OTHER PUBLICATIONS www.engadget.com/2015/10/06/hololens-project-x-lets-you-blast-robot-armies-with-a-ray-gun/> [retrieved Mar. 22, 2017], 8 pages.

Templeman, R., et al., "PlaceAvoider: Steering First-Person Cameras Away From Sensitive Spaces," Proceedings of the Network and Distributed System Security Symposium (NDSS '14), San Diego, Feb. 23-26, 2014, pp. 1-15.

Tran, C., et al., "A Left-Turn Driving Aid Using Projected Oncoming Vehicle Paths With Augmented Reality," Proceedings of the 5th International Conference on Automotive User Interfaces and Interactive Vehicular Applications, Eindhoven, Netherlands, Oct. 28-30, 2013, pp. 300-307.

Unity, "Develop Mixed Reality Applications With Unity for Microsoft HoloLens," Unity 3D, <https://unity3d.com/pages/window> [retrieved Mar. 22, 2017], 5 pages.

Van Krevelen, D., and R. Poelman, "A Survey of Augmented Reality Technologies, Applications, and Limitations," The International Journal of Virtual Reality 9(2):1-20, Mar. 2010.

Vilk, J., et al., "SurroundWeb: Mitigating Privacy Concerns in a 3D Web Browser," Proceedings of the IEEE Symposium on Security and Privacy, San Jose, Calif., May 17-21, 2015, pp. 431-446.

Wojciechowski, R., "Modeling Interactive Educational Scenarios in a Mixed Reality Environment," Doctoral Dissertation, Technical University of Gdańsk, Poland, Apr. 2008, 186 pages.

Zhou, F., et al., "Trends in Augmented Reality Tracking, Interaction and Display: A Review of Ten Years of ISMAR," Proceedings of the 7th IEEE/ACM International Symposium on Mixed and Augmented Reality, Cambridge, U.K., Sep. 15-18, 2008, pp. 193-202.

\* cited by examiner

| ID | CONDITION | ENFORCEMENT |
|---|---|---|
| P1 | IF VIRTUAL OBJECT'S SPEED EXCEEDS $X_1$ | SET THE VIRTUAL OBJECT'S SPEED TO $X_1$ |
| P2 | IF VIRTUAL OBJECT IS WITHIN $X_2$ FEET OF THE USER | SET THE VIRTUAL OBJECT'S ALPHA VALUE TO 0 |
| P3 | IF VIRTUAL OBJECT OCCUPIES MORE THAN $X_3$ PERCENT OF THE DISPLAY | SET THE VIRTUAL OBJECT'S ALPHA VALUE TO 0 |
| P4 | IF VIRTUAL OBJECT IS HEAD LOCKED | DENY CREATION REQUEST OR DESTROY OBJECT |
| P5 | IF USER IS DRIVING A VEHICLE THAT IS IN MOTION AND VIRTUAL OBJECT IS A MEDIA NOTIFICATION | SET THE VIRTUAL OBJECT'S ALPHA VALUE TO 0 |
| P6 | IF VIRTUAL OBJECT IS OCCLUDING A HUMAN OR A ROAD SIGN | SET THE VIRTUAL OBJECT'S ALPHA VALUE TO 0 |
| P7 | IF VIRTUAL OBJECT IS OCCLUDING AN EXIT SIGN | SET THE VIRTUAL OBJECT'S ALPHA VALUE TO 0 |
| P8 | IF VIRTUAL OBJECT HAS AN ALPHA VALUE LOWER THAN $X_4$ | DISABLE USER INTERACTIONS WITH VIRTUAL OBJECT |
| P9 | IF VIRTUAL OBJECT IS A 2D IMAGE OR VIDEO AND IS NOT BOUNDED BY A REAL-WORLD BILLBOARD | SET THE VIRTUAL OBJECT'S ALPHA VALUE TO 0 |
| P10 | IF VIRTUAL OBJECT IS OCCLUDING A PORTION OF ANOTHER APPLICATION'S VIRTUAL OBJECT | SET THE VIRTUAL OBJECT'S ALPHA VALUE TO 0 |

*FIG. 4*

|          | BASELINE | P1   | P2   | P3   | P6   | P7   | P8   | P10  |
|----------|----------|------|------|------|------|------|------|------|
| AVG FPS  | 51.4     | 51.3 | 48.0 | 39.2 | 49.0 | 43.7 | 43.8 | 32.3 |
| STD DEV  | 1.2      | 1.3  | 1.1  | 1.5  | 0.4  | 1.6  | 1.1  | 1.8  |

FIG. 7A

|          | BASELINE | P4   |
|----------|----------|------|
| AVG FPS  | 4.6      | 57.7 |
| STD DEV  | 1.0      | 2.0  |

FIG. 7B

|          | BASELINE | P9   |
|----------|----------|------|
| AVG FPS  | 32.6     | 30.7 |
| STD DEV  | 1.0      | 1.2  |

FIG. 7C

METHODS AND SYSTEMS FOR PROVIDING PRESENTATION SECURITY FOR AUGMENTED REALITY APPLICATIONS

CROSS-REFERENCE TO RELATED APPLICATION

This application claims the benefit of Provisional Application No. 62/264,729, filed Dec. 8, 2015, the entire disclosure of which is hereby incorporated by reference for all purposes.

STATEMENT OF GOVERNMENT LICENSE RIGHTS

This invention was made with Government support under Grant CNS-1513584 awarded by the National Science Foundation. The Government has certain rights in the invention.

BACKGROUND

Augmented reality (AR) technologies enable users to interact with virtual content in fundamentally new ways. AR technologies capture input from a user's surroundings, such as video data, depth sensor data, and/or audio data, and they overlay a virtual presentation directly on the user's perception of the real world using presentation devices including but not limited to smartphones, head-mounted displays (HMDs), and automotive windshields. While efforts to commercialize augmented reality technologies are relatively young, they are beginning to capture the attentions of users worldwide. For example, the wildly popular mobile augmented reality app Pokémon Go brought in over $600 million in revenue in its first three months after release, making it the most successful mobile game in history. However, the potential of augmented reality lies far beyond simple smartphone games, and we are beginning to see rapid growth in new augmented reality technologies. For example, the HoloLens HMD is now available from Microsoft Corporation to developers internationally, Meta's second-generation HMD is available for pre-order, and Google has invested over $500 million in the HMD startup Magic Leap. Additionally, many groups within the automotive industry are developing AR-enabled windshields to aid drivers. Overall, interest in employing AR technologies across diverse industry sectors is increasing, with AR as a whole projected to grow into a $100 billion industry by the year 2020.

Though AR technologies have the potential to deliver tremendous benefits, they also raise new privacy and security risks. A growing body of literature focuses on mitigating privacy risks that stem from applications' needs to gather input from the numerous sensors on AR devices, such as cameras. This literature does not, however, address the complementary issue of the risks that arise from AR applications' abilities to modify the user's view of the world, which constitute security risks of AR output. Addressing these risks is particularly critical for fully immersive AR systems, such as HMDs and car windshields, where users cannot easily disengage from their devices if output security issues arise.

To illustrate potential security risks related to AR output, imagine driving a car with an AR-enabled windshield. Some potential features of this technology include the ability to visibly highlight lane markers to prevent accidental lane drift, to display turn-by-turn driving directions visually overlaid on the road, and to visibly warn the driver of impending collisions. These tasks might run on an AR system as multiple components of a single application, or as multiple, distinct applications. Without appropriate output safeguards, however, the benefits of these applications can be overshadowed by risks. For example, a malicious or buggy AR application could potentially obscure real-world pedestrians, overlay misleading information on real-world road signs, or occlude the virtual content of other AR applications, such as collision warnings or other important safety alerts. Similar issues could arise with HMDs for a user on foot. Consider, for example, an HMD application that accidentally or intentionally blocks the user's view of a tripping hazard or an oncoming car.

To our knowledge, no existing industry or research AR platforms are designed to mitigate the above types of output security risks. Today, it is the responsibility of the applications themselves to safely generate output, and AR systems do not themselves enforce any types of output policies. Placing this responsibility with application developers who may generate buggy, vulnerable, or malicious code, is not reliable. Furthermore, the fact that today's AR platforms cannot exert any control over the output from individual applications means they also cannot handle conflicts between the output from multiple applications. HoloLens sidesteps this problem by simply not supporting multiple full-screen immersive AR applications running at once, and so is not even capable of providing this functionality.

What is needed are improvements to augmented reality systems to provide output security, even in the face of multiple concurrently executing untrusted applications. It is also desirable to provide output security without unduly impacting overall system performance.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for providing an augmented reality presentation is provided. The system comprises at least one augmented reality presentation device and an augmented reality platform device. The augmented reality platform device has at least one processor, and is configured to process a request to present a virtual object by: using one or more policies to evaluate the request to present the virtual object; in response to determining that no policies are violated, presenting the virtual object using the at least one augmented reality presentation device; and in response to determining that one or more policies are violated: altering a state of the virtual object to comply with the one or more violated policies; and selectively rendering the altered virtual object using the at least one augmented reality display device.

In some embodiments, a method of presenting information in an augmented reality system that provides output security is provided. Real-world object information that indicates a presence of a real-world object detected by an augmented reality system is received. A presentation filter for virtual information is adjusted, wherein the adjusting includes: evaluating a predicted presentation result of presenting the virtual information in light of the real-world object information using a policy; and in response to determining that the policy would be violated by the predicted presentation result, updating the presentation filter to be applied to the virtual information to reduce intrusiveness of the virtual information presentation based on the violated policy. The virtual information is presented based on the presentation filter.

In some embodiments, a system for providing an augmented reality presentation is provided. The system comprises at least one augmented reality presentation device, and an augmented reality platform device. The augmented reality platform device has at least one processor and a non-transitory computer-readable medium having computer-executable instructions stored thereon that, in response to execution by the at least one processor, cause the augmented reality platform device to provide an operating system and a set of untrusted applications. The operating system is configured to control access to the at least one augmented reality presentation device and to manage a set of virtual objects for presentation by the at least one augmented reality presentation device. The operating system is further configured to: receive a first request from a first untrusted application of the set of untrusted applications to present a first virtual object; receive a second request from a second untrusted application of the set of untrusted applications to present a second virtual object; and cause the at least one augmented reality presentation device to present the first virtual object and the second virtual object. The first untrusted application and the second untrusted application are executed in different isolated processes.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a table that illustrates a non-limiting example set of desirable output policies that may be used with embodiments of the present disclosure;

FIGS. 7A-7E are charts that illustrate the result of testing a prototype of an embodiment of the augmented reality system 300, using the policies outlined in FIG. 4.

DETAILED DESCRIPTION

Figure 1:
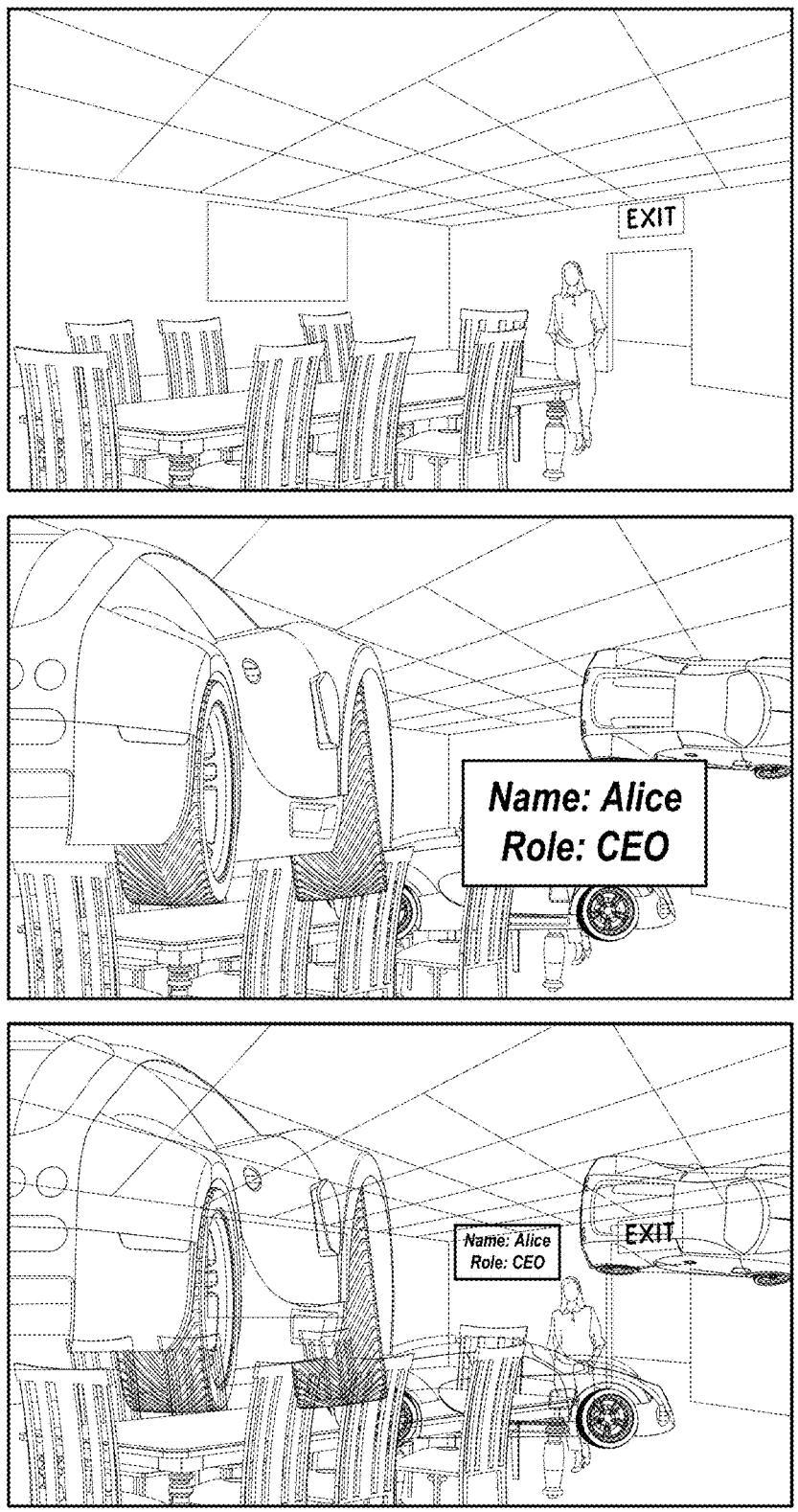
FIG. 1 illustrates three presentations that show an example of some of the problems being faced and addressed by embodiments of the present disclosure.

In some embodiments of the present disclosure, an augmented reality system is provided that incorporates output security as an explicit, first-class goal. In the threat model of embodiments of the present disclosure, portions incorporated into the augmented reality system are trusted, but the AR applications running thereon are untrusted. With the output security mechanisms enabled, untrusted applications are still provided significant flexibility to create immersive AR experiences, but their visual content is constrained by the platform based on one or more output policies.

To support such policies, some embodiments of the present disclosure provide an AR output policy specification framework that allows policy writers to specify both (1) a condition under which the policy is violated (e.g., when a virtual object obscures a real-world person) and (2) an action to take (e.g., make the offending virtual object partially transparent). In some embodiments, the policy framework is constrained in order to support composable policies and to limit the potential performance or other impacts of buggy or malicious policies.

The interaction of multiple AR applications with each other and with the user's view of the real world raises risks. If one of the apps was malicious or buggy, it could annoy or distract the user with spurious content (e.g., poorly-placed ads); endanger the user by occluding critical information from the real world (e.g., by obscuring oncoming vehicles); or perform a denial of service attack on another application by occluding that application's output (e.g., a Pokémon creature that prevents the user from seeing navigation directions).

While the present discussion primarily describes these risks in terms of an HMD platform, it should be noted that these risks extend across platforms and domains, such as AR-enabled windshields, which—like HMDs—are fully immersive. They also extend to less immersive AR platforms, such as stand-alone smartphone applications.

These risks inform the threat model and security goals of the present disclosure. Specifically, the present disclosure considers execution of one or more malicious, buggy, or compromised applications that create AR content presentations which may: (1) obscure another application's virtual content, whether unintentionally or intentionally in order to hide or modify its meaning; (2) obscure important real-world content, such as traffic signs, cars, or people; or (3) disrupt the user physiologically, including, but not limited to, startling them by suddenly creating or quickly repositioning virtual objects, by suddenly presenting high-volume sounds, by presenting haptic feedback at an inopportune time, and/or the like.

In some embodiments of the present disclosure, a virtual object abstraction is used for displaying output. Conceptually, virtual objects are primitives within an operating system of the augmented reality system that encapsulate virtual content that applications wish to present to a user within the augmented reality environment. For example, a Pokémon creature may be created as a virtual object. A single application may generate many such virtual objects. A virtual object may include a visual representation and associated characteristics, including but not limited to location, size, opacity, lighting, and textures. A virtual object may include non-visual characteristics, including but not limited to a tactile texture, a smell, a sound, and a haptic effect. AR applications may create and transform these objects (e.g., by moving, rotating, or resizing them) to provide objects to be presented by the augmented reality system.

In some embodiments, using virtual objects as a component of the operating system to provide presentation functionality, rather than requiring that applications individually update the locations of their objects as the user moves throughout the physical world, allows applications to easily create "world-locked" virtual objects that are attached to real-world locations or objects. The augmented reality platform itself then automatically updates where the world-locked virtual objects are presented to the user based on motion sensed by the platform. For example, if an AR application executing on an HMD attaches a virtual object to a real-world table, some embodiments of the present disclosure will maintain the location of the virtual object with respect to the real-world table as the user moves without requiring that the AR application update how the virtual object is displayed. This is different from HoloLens, which merely supports world-locked objects at the application layer, not as a part of output management provided by the OS.

It should be noted that the virtual object model described herein differs from the "window" display abstraction traditionally provided to desktop applications, in which desktop applications have full control over a contiguous rectangular screen area. One benefit of virtual objects as descried herein is that they allow the augmented reality system to reason about application output and enforce policies at the granularity of individual objects. For example, if one virtual object obscures a real-world person, the augmented reality system can take action against that one object (e.g., to make it transparent) without affecting the rest of the application's output.

FIG. 1 illustrates three presentations that show an example of some of the problems being faced and addressed by embodiments of the present disclosure. The top drawing illustrates a real-world scene in a meeting room as viewed by a user of an idle augmented reality system. A table, a set of chairs, a whiteboard, an "exit" sign, and another person ("Alice") are all visible to the user.

The middle drawing illustrates an example of unconstrained application output, and the resulting lack of output security. As shown, a large 3D model of a car is being displayed by an application on the left side of the viewing area, and obscures most of the view (including the whiteboard). Another 3D model of a car is being displayed by an application (possibly by the same application) on the right side of the viewing area, and obscures the "exit" sign. Yet another 3D model of a car is being displayed in a location that obscures the other person. Another application has detected Alice in the room, and to identify her it has placed an intrusive badge over both her body and one of the 3D models of a car.

The bottom drawing illustrates a similar scene, with output security policies enforced. Because the middle and right car models were determined to be obscuring recognized real-world objects such as a human and a sign, their opacity has been reduced to reduce their intrusiveness. Because the left car model was too large and taking up too much of the display area, its opacity has been reduced as well. Finally, the badge identifying Alice has been moved to a less intrusive location and has also had its opacity reduced.

Figure 2:
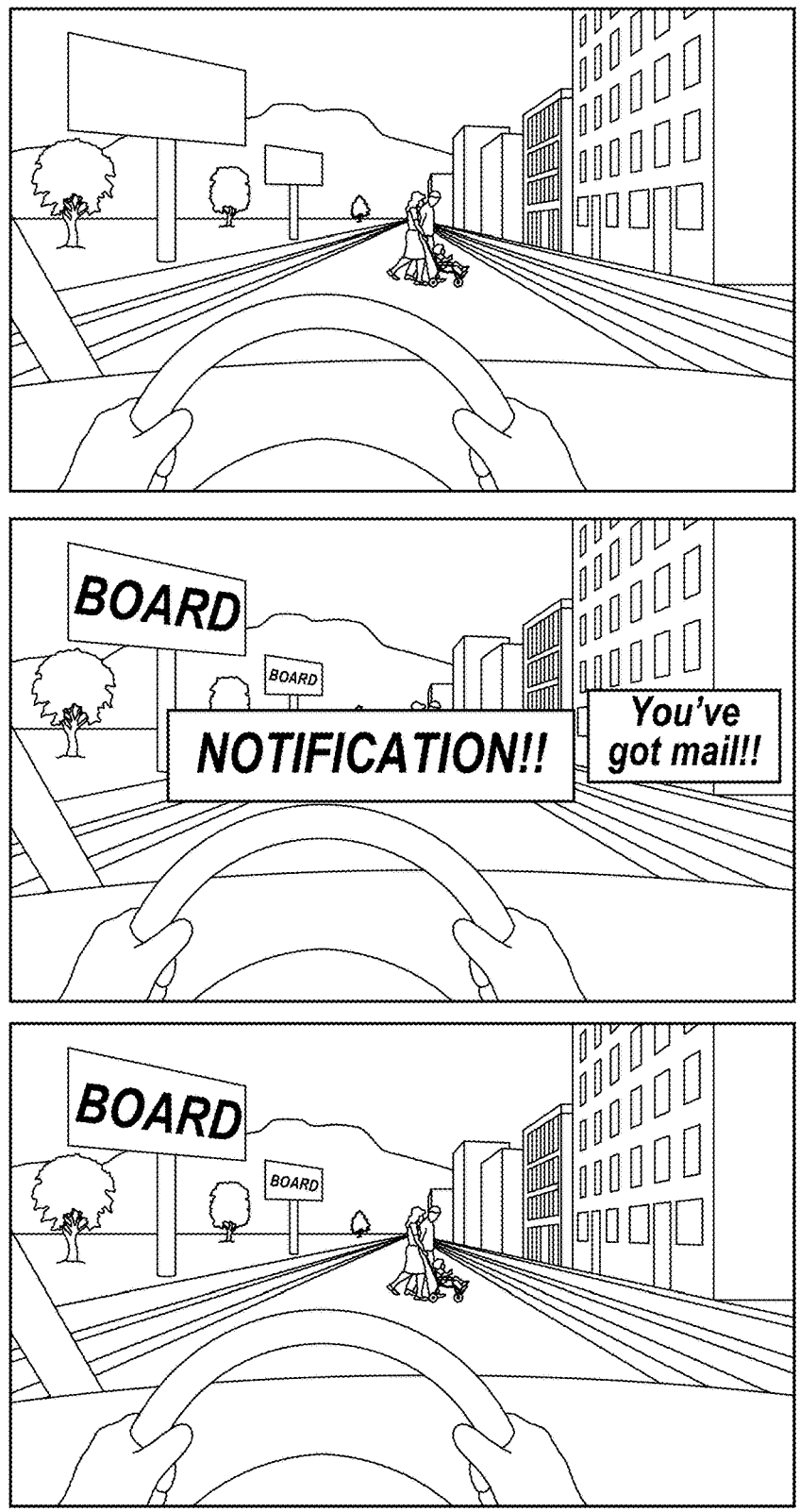
FIG. 2 illustrates three presentations that show another example of some of the problems being faced and addressed by embodiments of the present disclosure.

FIG. 2 illustrates three presentations that show another example of some of the problems being faced and addressed by embodiments of the present disclosure. The top drawing illustrates a real-world scene behind the wheel of a car that is equipped with an augmented reality windshield display. In the top drawing, the augmented reality windshield display is blank, and the driver can see a family crossing the street as well as several billboards.

In the middle drawing, unconstrained application output shows the dangers that are faced. A first application has received notification of the locations of the billboards, and has presented images overlaid on the billboards. The same application, however, has also displayed a notification across the middle of the windscreen, obscuring the family that is crossing the street. A separate application has created another notification on the right side of the windscreen indicating that the user has received mail, which, if the vehicle is moving, could be a dangerous distraction.

In the bottom drawing, the intrusiveness of the application output has been reduced by enforcing output security. The virtual objects that were assigned to the billboards are allowed to remain, but the virtual object that obscured the humans detected by the system has been made completely transparent. The virtual object that presented the mail notification was prevented from being presented in response to determining that the vehicle was in motion.

Figure 3:
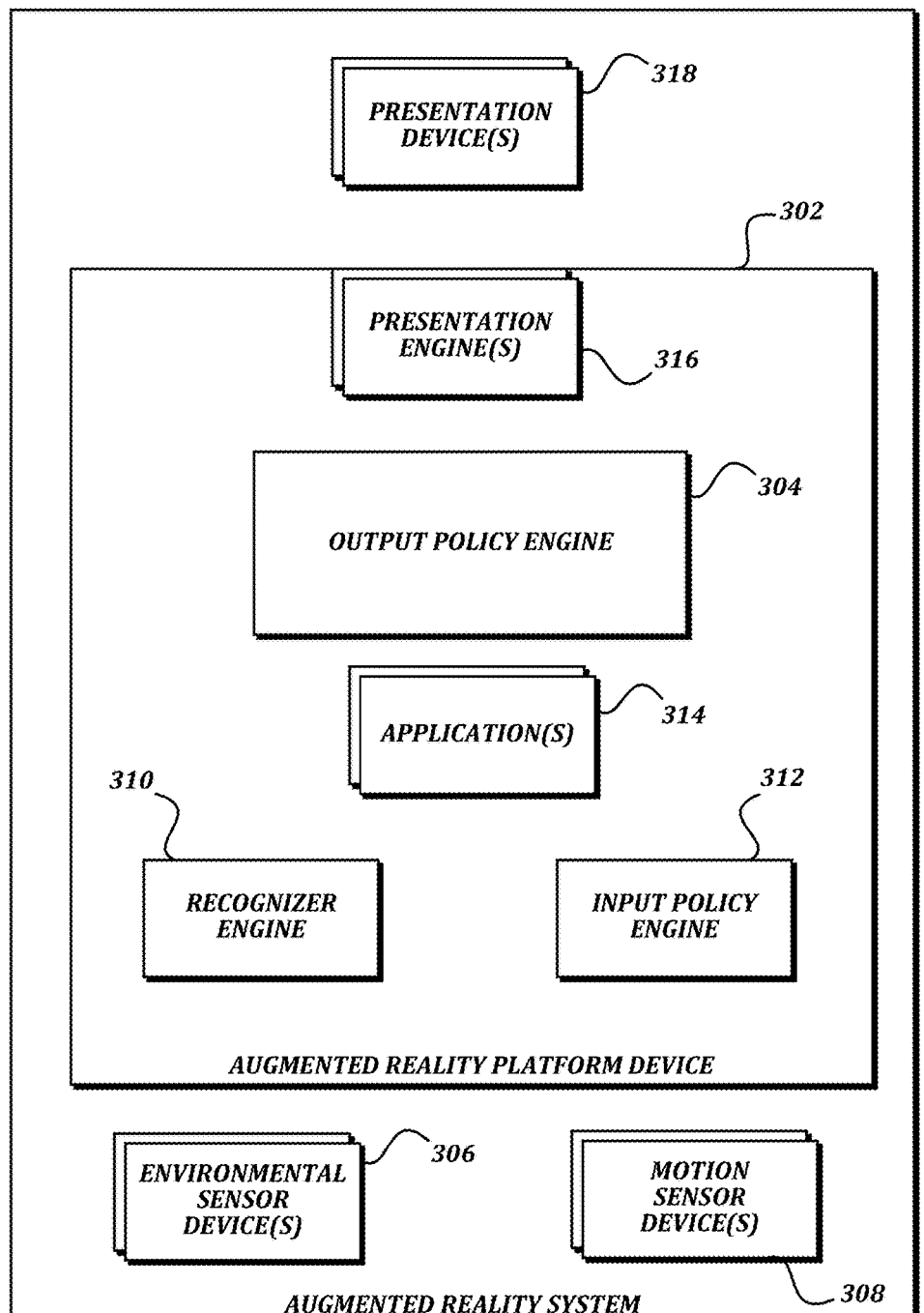
FIG. 3 is a block diagram that illustrates an example embodiment of an augmented reality system according to various aspects of the present disclosure.

FIG. 3 is a block diagram that illustrates an example embodiment of an augmented reality system according to various aspects of the present disclosure. The augmented reality system 300 includes one or more environmental sensor devices 306, one or more motion sensor devices 308, one or more presentation devices 318, and an augmented reality platform device 302.

In some embodiments, the one or more environmental sensor devices 306 include devices that generate information regarding the surroundings of the augmented reality system 300. Some example environmental sensor devices 306 include, but are not limited to, photographic digital video cameras, depth cameras, microphones, microphone arrays, ambient light sensors, eye tracking sensors, gaze tracking sensors, indoor positioning sensors, and GPS sensors. In some embodiments, the one or more motion sensor devices 308 include devices that generate information regarding the motion of the augmented reality system 300. Some example motion sensor devices 308 include, but are not limited to, accelerometers, gyroscopes, and magnetometers. In some embodiments, one or more photographic video cameras and/or depth cameras may be used as motion sensor devices 308 as well as environmental sensor devices 306.

In some embodiments, the one or more presentation devices 318 include devices that present information to a user of the augmented reality system. The presentation of information may include, but is not limited to, one or more of video, audio, tactile feedback, haptic feedback, and smell. Accordingly, some examples of presentation devices 318 include, but are not limited to, a video screen, a projector, an optical waveguide, a loudspeaker, a vibration motor, and a smell generator.

The augmented reality platform device 302 may be any suitable computing device for providing the illustrated and described components. In some embodiments, the augmented reality platform device 302 may be a wearable device that is a part of or is otherwise communicatively coupled to a head mounted display. In some embodiments, the augmented reality platform device 302 may be a desktop computing device, a laptop computing device, a tablet computing device, a smartphone computing device, and/or any other suitable type of computing device that is configured to receive information from the environmental sensor devices 306 and the motion sensor devices 308, and to cause information to be presented by the presentation devices 318. In some embodiments, a second computing device (such as a holographic processing unit from Microsoft Corporation) may receive sensor information directly from the environmental sensor devices 306 and/or the motion sensor devices 308 for pre-processing before providing processed environmental and motion information to the augmented reality platform device 302.

The augmented reality platform device 302 is also configured to provide a recognizer engine 310, an input policy engine 312, an output policy engine 304, and one or more presentation engines 316. The term "engine" as used herein refers to, in general, circuitry, logic embodied in hardware, and/or software instructions executable by a processor of a computing device. Examples of logic embedded in hardware includes standard logic gates, application specific integrated circuits ("ASICs"), field-programmable gate arrays ("FPGAs"), microcell arrays, programmable logic arrays ("PLAs"), programmable array logic ("PALs"), complex programmable logic devices ("CPLDs"), erasable programmable logic devices ("EPLDs"), and programmable logic controllers ("PLCs"). Logic embodied in software instructions may be written in any programming language, including but not limited to C, C++, COBOL, JAVA™, PHP, Perl, HTML, CSS, JavaScript, VBScript, ASPX, HDL, and/or Microsoft .NET™ programming languages such as C#. The software for an engine may be compiled into an executable program or written in an interpreted programming language for execution by a suitable interpreter or virtual machine executed by a processing circuit or processor. Engines may be callable, executable, or controllable from other engines, or from themselves.

Generally, the engines described herein refer to logical modules that can be merged with other engines or applications, or can be divided into sub-engines. The engines can be stored in any type of computer readable medium or computer storage device and be stored on and executed by one or more general purpose computers, thus creating a special purpose computer configured to provide the engine. Accordingly, the devices and systems illustrated herein include one or more computing devices configured to provide the illustrated engines, though the computing devices themselves have not been illustrated in every case for the sake of clarity.

In some embodiments, the recognizer engine 310 is configured to provide one or more recognizers. Each recognizer receives information from one or more environmental sensor devices 306 and/or one or more motion sensor devices 308, and detects specific real-world objects based on the information. For example, recognizers may be configured to detect visible real-world objects that include, but are not limited to, vehicles, humans, animals, faces, planar surfaces, signs (including but not limited to road signs, emergency exit signs, signs directing users to automatic external defibrillators (AED), and signs for fire extinguishers), billboards, surface discontinuities (including but not limited to stairs, potholes, curbs, and cliffs), hot surfaces (including but not limited to stoves, ovens, and fires). Recognizers may also be configured to detect non-visible real-world phenomena that could be obscured by virtual objects, including but not limited to audible alarms, smells that indicate danger (including but not limited to the smell of smoke and the smell of natural gas). In some embodiments, once a recognizer detects a real-world object, it creates a high-level object that represents the real-world object to other components of the augmented reality platform device 302, including the output policy engine 304 and the input policy engine 312. The high-level object generated by the recognizer may be of a type associated with the particular detected real-world object, and may include some information that is similar to the information associated with a virtual object, such as a location, size, audio, and/or the like.

In some embodiments, the recognizer engine 310 is prevented by the augmented reality platform device 302 from providing information directly to applications 314, in order to help protect the privacy of information generated by the sensor devices 306, 308. In some embodiments, the input policy engine 312 receives the information from the recognizer engine 310 and decides which information should be provided to applications 314. In some embodiments, the input policy engine 312 may also provide raw sensor data (including but not limited to a video feed or an audio feed) to applications, if it determines that a particular application 314 should have access to the information. The input policy engine 312 therefore helps provide input security, at least in that it can provide applications 314 with only data they need to function, and can restrict applications 314 from receiving further information. For example, an application 314 that overlays an image over a detected real-world billboard does not need authorization to access data from a raw video feed, but can instead simply be provided real-world object information generated by a recognizer configured to detect billboards, which may be limited to the spatial location of the planar surface of the billboard. In some embodiments, the input policy engine 312 may be configurable using a permission system, wherein an application 314 may request that the input policy engine 312 provide various types of information, and the input policy engine 312 can consult permissions granted to the application 314 before providing the requested information.

In some embodiments, the presentation engines 316 are configured to receive requests to present information on one or more presentation devices 318, and provide the information to the presentation devices 318 in a suitable format. Some examples of presentation engines 316 include, but are not limited to, a video driver, an audio driver, and a haptic feedback driver.

As discussed above, the augmented reality platform device 302 is configured to execute one or more untrusted applications 314. In some embodiments, the applications 314 are not allowed direct access to presentation engines 316. Instead, the applications 314 must request that presentations be generated via the output policy engine 304. In some embodiments, a virtual object paradigm as discussed above may be used, wherein applications 314 create virtual objects having at least a location and one or more of a size, a 3D model or shape, a texture, a sound, a smell, a tactile effect, and a haptic effect. The virtual objects are then provided by the applications 314 to the output policy engine 304 for management and presentation.

In some embodiments, the output policy engine 304 is configured to manage the virtual objects created by the applications 314, and to cause the presentation engines 316 to present the virtual objects as appropriate. In some embodiments, the output policy engine 304 uses information from the motion sensor devices 308 to cause world-locked virtual objects to be presented to appear in a fixed location in the real world, without requiring further input from the owning application 314.

In some embodiments, the output policy engine 304 evaluates the virtual objects in view of one or more output policies before causing the virtual objects to be presented. In some embodiments, output policies include at least two components: (1) a conditional predicate, boolean expression, or other factor that determines when the policy has been violated; and (2) one or more mechanisms, or actions that the output policy engine 304 should take when the policy has been violated.

In some embodiments, output policies may include conditions and mechanisms that are defined by arbitrary code. This approach would clearly support a wide range of policies. However, arbitrary policy code raises several concerns. The first is performance: in the worst case, an arbitrarily defined policy could halt the system by performing unbounded computation. The second is unexpected results due to buggy or untrusted policies: if policy mechanisms can arbitrarily modify virtual objects, then buggy policies, in the worst case, could pose the same risks as buggy applications 314 themselves.

Accordingly, in some embodiments, an explicitly restricted policy framework is used wherein output policies combine options from a well-defined set of parameterized conditions and mechanisms supported by the output policy engine 304. Though this construction is limited by design, we find that it is flexible enough to express a set of desirable policies. FIG. 4 is a table that illustrates a non-limiting example set of desirable output policies that may be used with embodiments of the present disclosure and created from the building blocks described below.

In some embodiments, a finite set of building blocks is provided that output policies can use to construct conditional predicates. Specifically, policies may refer to attributes of virtual objects and detected real-world objects that may include (1) presentation properties of virtual objects, including but not limited to apparent size, transparency, apparent speed, and sound volume, and (2) relationships between virtual objects and other virtual or real-world objects. For example, relational attributes may include DistanceFromUser( ) or IsOccluding(type), where "type" refers to a class of objects such as virtual objects or specific types of real-world objects detected by Arya's recognizers, such as people, against which to check for occlusion. For non-boolean attributes (such as DistanceFromUser( )), a policy's condition is then formed by comparing one or more attributes of a virtual object to parameter values specified by the policy—for example, "if DistanceFromUser( )<10 meters." Policy conditions may also refer not only to the attributes of AR objects, but also on global contextual information. For example, a policy may depend on properties of the user's platform (e.g., if a user's car is in motion) or other contextual information (e.g., time of day).

Since multiple policies may be triggered at once, if enforcement is left unrestrained, certain combinations of policy mechanisms may conflict with each other or create a cycle. For example, one policy that moves a virtual object away from occluding a person may cause the virtual object to block a road sign, thereby violating a different policy. Or consider a policy that reduces an object's transparency at the same time another policy attempts to increase its transparency.

It is not immediately obvious how to design policy mechanisms that are composable yet sufficiently flexible to express meaningful policies. To do so, embodiments of the present disclosure consider that the goal of output policies is to ensure that the applications 314 cannot modify the user's view of the real world or interfere with each other in dangerous or otherwise undesirable ways. Thus, policies generally constrain application output to be less intrusive, so that the result of enforcement of any given policy is closer to an unmodified view of the real world. Accordingly, in some embodiments, only policy enforcement mechanisms are provided that move virtual objects to a "less intrusive" state. In other words, policy enforcement mechanisms can make objects smaller, slower, more transparent, quieter, remove them, deny their creation or presentation entirely, or perform other actions that reduce the intrusiveness of the presentation of the virtual object. However, they cannot make objects more intrusive, i.e., larger, faster, more opaque.

This design of policy mechanisms provides for composability of arbitrary numbers of policies. For example, one violated policy may wish to set a virtual object's opacity to 50%, and another violated policy may wish to set the virtual object's opacity to 30% (more transparent). As stated, both policies cannot be satisfied at once—the virtual object cannot have both 50% and 30% opacity at the same time. However, if the enforcement mechanisms of both policies are limited to modifying attributes to be less intrusive—in this case, more transparent—we can consider these policies as indicating desired thresholds. That is, the first policy wishes to enforce a maximum of 50% opacity, and the second a maximum of 30%. Formulated this way, these policies compose: setting the object's opacity to 30% satisfies both policies. Thus, given some set of thresholds set by different policies, the output policy engine 304 takes the most restrictive intersection (or the attribute values that result in the least intrusive state) and enforces these thresholds on the virtual objects.

In addition to supporting composable policies, this design also ensures that the output policy engine 304 will avoid situation in which policies flip-flop, for example, with one making a virtual object more transparent and the next making the virtual object less transparent. In the above example, the subsequent activation of a third policy specifying a higher maximum opacity (e.g., 60%) would not change the resulting, most restrictive value (30%). This design decision intentionally disallows mechanisms that might result in cyclic policy violations or lead to complex constraint solving, but in some embodiments, policy enforcement mechanisms that do provide complex constraint solving may sometimes be desirable and used (e.g., automatically repositioning virtual objects instead of merely decreasing opacity).

The illustrated components of the augmented reality system 300 may be packaged together in a single device, or may be provided by multiple devices. For example, some embodiments may mount one or more of the environmental sensor devices 306, presentation devices 318, and motion sensor devices 308 on an HMD, while the augmented reality platform device 302 may be a separate device that is communicatively coupled to the HMD. As another example, at least some of environmental sensor devices 306 or motion sensor devices 308 may be positioned remotely from the rest of the components of the augmented reality system 300, such as with the Oculus Constellation motion tracking sensor.

Figure 5:
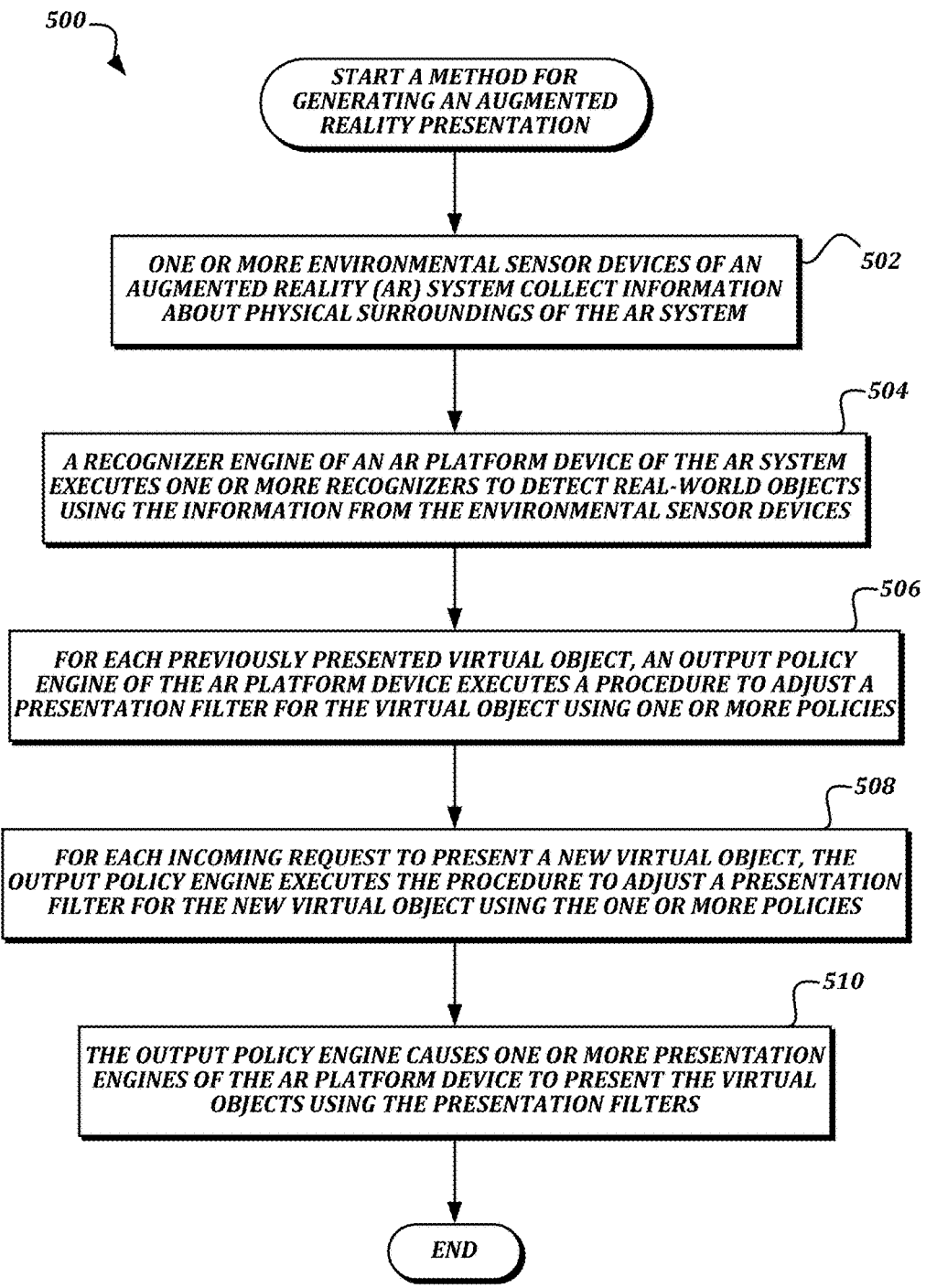
FIG. 5 is a flowchart that illustrates an example embodiment of a method for generating an augmented reality presentation according to various aspects of the present disclosure.

FIG. 5 is a flowchart that illustrates an example embodiment of a method for generating an augmented reality presentation according to various aspects of the present disclosure. From a start block, the method 500 proceeds to block 502, where one or more environmental sensor devices 306 of an augmented reality (AR) system 300 collect information about physical surroundings of the augmented reality system 300. Examples of the types of information about the physical surroundings that may be collected include, but are not limited to, one or more of video data, audio data, depth data, ambient light data, and gaze data. In some embodiments, the information may be raw sensor data. In some embodiments, the information may be preprocessed by the sensor devise or another processor in order to simplify the data for processing by the augmented reality platform device 302.

Next, at block 504, a recognizer engine 310 of an augmented reality platform device 302 of the augmented reality system 300 executes one or more recognizers to detect real-world objects using the information from the environmental sensor devices 306. As discussed above, the recognizers may then provide real-world object data to the output policy engine 304 for the detected real-world objects.

Figure 6:
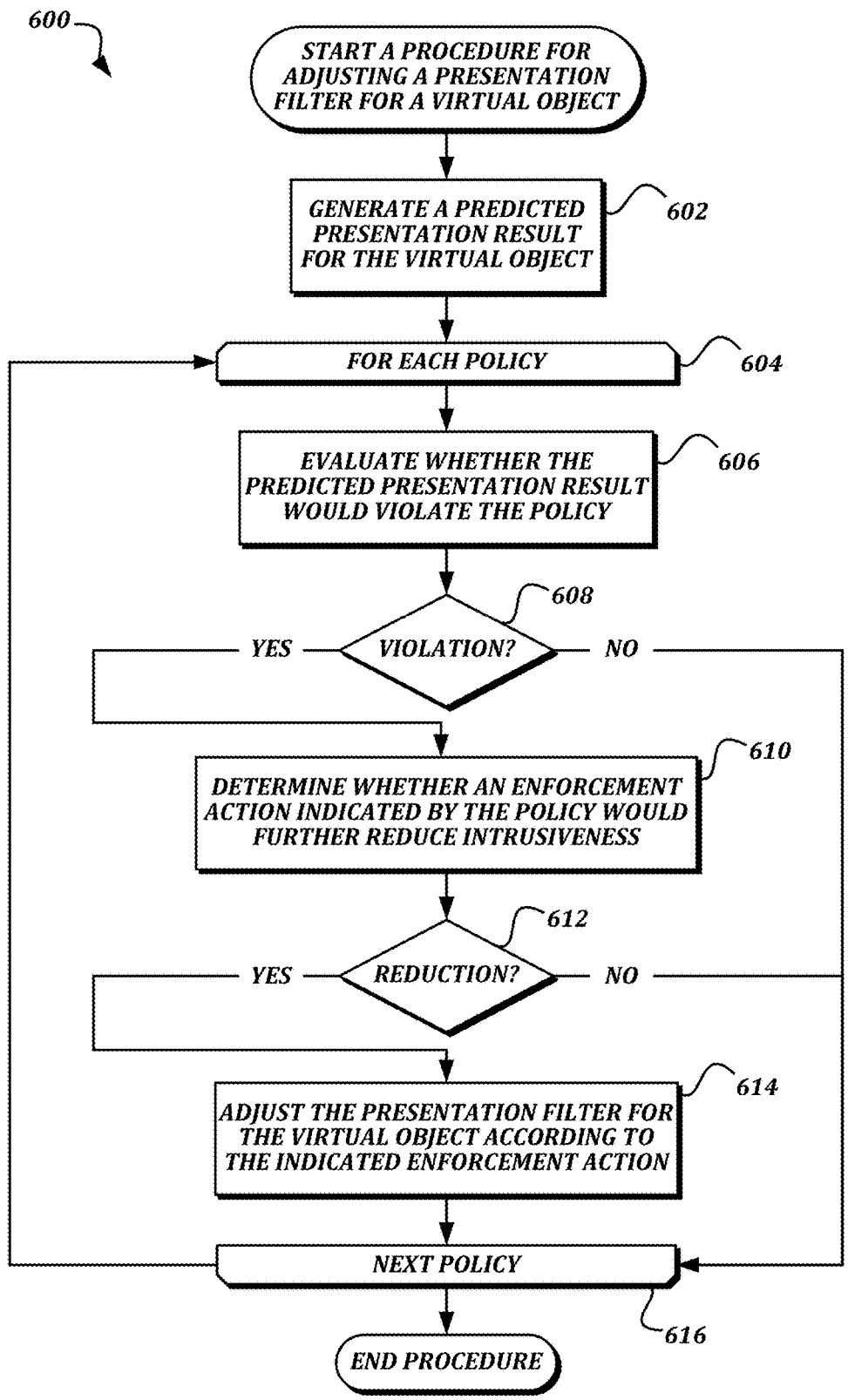
FIG. 6 is a flowchart that illustrates an example embodiment of a procedure for adjusting a presentation filter for a virtual object according to various aspects of the present disclosure.

In some embodiments, the method 500 may be performed repeatedly, such as during a frame rendering loop. As such, some virtual objects may have already been presented during a previous execution of the frame rendering loop. Accordingly, at block 506, for each previously presented virtual object, an output policy engine 304 of the augmented reality platform device 302 executes a procedure to adjust a presentation filter for the virtual object using one or more policies. In some embodiments, the presentation filter represents the result of composing the enforcement actions of one or more violated policies, and can be used to reduce the intrusiveness of the virtual object. One example of a suitable procedure for use at block 506 is illustrated in FIG. 6 and described in detail below.

Just as some virtual objects may be previously presented, other virtual objects may be newly created as a result of an API call (or other way of providing a new virtual object to the output policy engine 304) on a given execution of the method 500. Accordingly, at block 508, for each incoming API request to present a new virtual object, the output policy engine 304 executes the procedure to adjust a presentation filter for the new virtual object using the one or more policies. In some embodiments, instead of creating a new virtual object, the API request may be a request to update the state of an existing virtual object. In some embodiments, the same procedure used at block 506 may be used to process the new or updated virtual objects. In some embodiments, the procedure illustrated in FIG. 6 and described in detail below is also suitable for use at block 508.

Once the relevant presentation filters are adjusted, the method 500 proceeds to block 510, where the output policy engine 304 causes one or more presentation engines 316 of the augmented reality platform device 302 to present the virtual objects using the presentation filters. The output policy engine 304 may cause more than one presentation engine 316 to be used to present a given virtual object because the given virtual object may be presented in more than one form at once, including but not limited to visually and audibly. In such a case, the presentation filter might affect both aspects. For example, if a presentation filter reduces a visual presentation to 0% opacity or otherwise makes a virtual object invisible, the presentation filter may also cause a volume of an associated audio presentation to be reduced to zero, since it may not be desirable for a user to hear a virtual object that they can't see. In some embodiments, the virtual object itself might retain its pre-filter state, and the only change will occur between the output policy engine 304 and the presentation driver 316. In some embodiments, the presentation filter may modify the virtual object to match the requirements of the presentation filter in order to inform the application 314 of the altered presentation.

It is worth noting that decoupling the evaluation of policies (as in blocks 506 and 508) from the enforcement of the policies (as in block 510) can help avoid temporary violations of output policies and avoids having to roll back the results of API calls. For example, consider a policy which reduces the opacity of virtual objects that occlude real-world people to 0.2. What happens if, after this policy is enforced, the application calls SetAlpha(1.0) to make that object opaque? If we naively evaluate the policy on the current frame before processing the API call, the object will—at least temporarily, for one frame—violate the policy. Such a temporary violation, particularly if the application calls SetAlpha(1.0) repeatedly, could nevertheless be disruptive to the user. On the other hand, if we process the API call before enforcing the per-frame policy, we create additional overhead by needing to roll back the results of the API call.

Decoupling the adjustment of the presentation filter from presenting the virtual objects using the presentation filter helps avoid both of these problems. In the above example, the policy sets an opacity threshold of 0.2 when it is for the existing virtual object at block 506. That threshold is immediately effective. To avoid temporary violations, that thresholds is also enforced on any API calls processed in the same frame, at block 508. That is, when the output policy engine 304 handles the SetAlpha(1.0) API call, it respects the current opacity threshold for that object, not exceeding 0.2.

As illustrated, the method 500 then proceeds to an end block and terminates. As discussed above, in some embodiments the method 500 might loop back to the start block for each frame, might loop back to the start block each time a change is detected by an environmental sensor device 306 or motion sensor device 308, or may otherwise execute repeatedly.

In some embodiments, the output policy engine 304 may not use presentation filters to enforce policies. Instead, the output policy engine 304 may alter the state of virtual objects directly to enforce policies. In some embodiments, the augmented reality platform device 302 may not use virtual objects. Instead, the output policy engine 304 may instead process draw requests or other types of requests intended for the presentation engines 316, and may predict presentation results and evaluate output policies based on those requests. As discussed above, however, virtual objects may be helpful at least because they allow the output policy engine 304 to manage them for conflicts with each other and to abstract away details of the presentation engines 316, instead of requiring the applications 314 to take these things into account.

FIG. 6 is a flowchart that illustrates an example embodiment of a procedure for adjusting a presentation filter for a virtual object according to various aspects of the present disclosure. In some embodiments, an output policy engine 304 of an augmented reality platform device 302 is configured to perform the steps of the procedure 600, but in some embodiments the procedure 600 (or parts thereof) could be performed by any other suitable device or component.

From a start block, the procedure 600 advances to block 602, where the output policy engine 304 generates a predicted presentation result for the virtual object. The predicted presentation result may include at least a location, as well as one or more other aspects of the presentation, including but not limited to a 2D shape to be presented, a 3D model to be presented, an audio sound and/or a volume of such sound, a smell, a tactile effect, and a haptic effect. In some embodiments, the location would be where the virtual object would be perceived by the user. In some embodiments, this location may be expressed as a relative location with respect to the viewpoint of the user. In some embodiments, the location may be expressed as a point or area in a real-world coordinate system.

The procedure 600 then advances to a for loop defined between a for loop start block 604 and a for loop end block 616, wherein the predicted presentation result is evaluated in view of each output policy for which the output policy engine 304 is configured. From the for loop start block 604, the procedure 600 advances to block 606, where the output policy engine 304 evaluates whether the predicted presentation result would violate the policy. For example, for a policy that determines whether a portion of a real-world object is occluded by the predicted presentation result, the output policy engine 304 may perform a ray tracing operation or a z-buffering operation in order to determine whether such occlusion would occur. As another example, for a policy that limits a size of virtual objects, the apparent size of the predicted presentation result may be determined. In other words, the output policy engine 304 may determine, based on the location with respect to the viewpoint, how large the virtual object would appear to the user. An object with a relatively small absolute size may violate such a policy if the location is too close to the user's viewpoint. As yet another example, for a policy that limits a speed of virtual objects, the apparent location of the predicted presentation result may be determined, and may be compared to a previous apparent location of the predicted presentation result. For such a determination, the output policy engine 304 may measure a radial speed with respect to the real-world coordinate system. In other words, such a policy may allow a virtual object to move quickly towards a user or away from a user, but may not allow a virtual object to move quickly across a viewpoint of the user. Since it is measuring speed with respect to the real-world environment, such a policy may also allow a presentation of a virtual object to move quickly within the display in order to maintain a stable location with respect to the real world if the user is themselves moving quickly. In some embodiments, a speed of the virtual object may be a first-order property of the virtual object, and the threshold may be applied directly to the speed property.

Next, at decision block 608, a decision is made based on whether the predicted presentation result would violate the policy. If the result of the decision is NO, then the procedure 600 proceeds to the for loop end block 616. Otherwise, if the result of the decision at decision block 608 is YES, then the procedure 600 advances to block 610, where the output policy engine 304 determines whether an enforcement action indicated by the policy would further reduce intrusiveness.

As discussed above, an enforcement action would further reduce intrusiveness if it changes a threshold value to a less intrusive setting. For example, if the threshold value specifies an opacity value, then lowering the opacity (to make the virtual object more transparent) would reduce the intrusiveness, whereas raising the opacity (to make the virtual object less transparent) would increase the intrusiveness. Likewise, if the threshold value specifies a maximum speed, then lowering the maximum speed would reduce intrusiveness, while raising the maximum speed would increase intrusiveness. In some embodiments, the built-in policy framework from which policies may be composed would have this determination pre-configured. In some embodiments wherein add-on policies are allowed, the intrusiveness check may be supplied by the programmer.

From block 610, the procedure 600 then advances to a decision block 612, where a decision is made based on whether the enforcement action would further reduce intrusiveness. If the result of the decision is NO, then the procedure 600 proceeds to the for loop end block 616. Otherwise, if the result of the decision at decision block 612 is YES, then the procedure 600 advances to block 614, where the output policy engine 304 adjusts the presentation filter for the virtual object according to the indicated enforcement action.

In some embodiments, the enforcement action of the presentation filter specifies an absolute value to which to set a threshold. For example, the enforcement action for opacity may specify a new opacity of 20%. In some embodiments, the enforcement action of the presentation filter may indicate a relative change. For example, the enforcement action for opacity may specify a reduction in opacity of 10% each time the policy is violated. In some embodiments, an enforcement action for speed or size may adjust the presentation filter by providing a new location or scaling factor that would make the virtual object slower or smaller.

In some embodiments, the application 314 that owns the virtual object may be informed of the presentation filter values when they are updated. This would allow the application 314 to check the actual presentation against what it intended to present, so it can adjust accordingly. In some embodiments, the application 314 that owns the virtual object may be informed when policies are first violated, and then informed again when they are no longer violated, so that the application 314 can reset any state that was changed when possible. Limiting the communication with the application 314 to this small amount of information can help avoid further privacy risks.

From block 614, the procedure 600 advances to the for loop end block 616. If further policies remain to be processed, the procedure 600 returns from the for loop end block 616 to the for loop start block 604 to process the next policy. Otherwise, if no more policies remain to be processed for the virtual object, the procedure 600 advances to an end block and terminates.

FIGS. 7A-7E are charts that illustrate the result of testing a prototype of an embodiment of the augmented reality system 300, using the policies outlined in FIG. 4. In practice, a full-fledged AR system has many moving parts—crucially, it continuously senses and processes real-world input, which feeds into applications as well as, in our design, the output policy engine itself. However, real-world input is by its nature noisy and variable. Even if we had perfect sensor hardware and sensor data processing algorithms, we would still like to evaluate in controlled, possibly hard-to-stage scenarios (e.g., while driving). Thus, since a controlled experiment is desired, we abstracted away the input handling part of the augmented reality system 300 for the prototype. Instead, an AR simulator was used, which includes of a virtual reality (VR) backend to represent the real world. Specifically, rather that outfitting the prototype with real hardware sensors, the Unity game engine was used to simulate real world scenes. This technique allows us to isolate the output management portion of the system and to reliably "detect" our simulated real-world objects. AR applications running on the prototype can create virtual objects to place into these scenes, and the prototype's output policy engine can regulate those objects given information about the fully-specified underlying VR world.

Since policy enforcement is on the critical path for rendering output, we measured the performance overhead introduced by the prototype's output policy engine. The results suggest that embodiments of the present disclosure are a promising technique for constraining AR output: not only does it successfully address, for the first time, many output security issues; it also does so with reasonable performance.

We evaluate the efficacy of the output policy engine through case study applications that run in three virtual scenes described in Section V that represent the real world: a home, a driving scene, and an office. We design our case study applications to exhibit both acceptable or desirable behaviors, as well as behaviors that violate one or more of our prototype policies detailed in FIG. 4. We begin by profiling our prototype's output policy engine without the overhead of application communication. To isolate the impact of the output policy engine, we create a simple evaluation scene containing several objects (a "person", a "billboard", and an "exit sign"). Rather than having a separate application process create and update AR objects, we instead programmatically trigger API calls directly in the output policy engine core on a per-frame basis. From the output policy engine's perspective, these requests appear to come from an actual application. This setup simulates application behaviors but eliminates any performance impact of the communication infrastructure and allows us to focus on the output policy engine itself. This methodology also allows us to ensure the same amount of work occurs each frame, enabling repeatable experiments.

Our primary performance metric for profiling the output policy engine is the frame rate, or average frames-per-second (FPS), of the Unity backend. Since many functions of the output policy engine (handling API calls and enforcing policies) operate on a per-frame basis, extra overhead introduced by the output policy engine directly decreases the frame rate, making this a meaningful metric. For each data point in our measurements, we calculated the average FPS over a 30 second interval (after an initial 10 second warm-up period), repeating each trial 5 times. We conduct two evaluations with this experimental setup: first, we compare the individual performance of the policies we implemented, and then we investigate policy performance as we scale the number of virtual objects in the scene.

We begin by trying to understand the performance impact of our individual policies relative to a baseline scene without any policy enforcement. These results are shown in FIG. 7A. In designing this experiment, our goal is to fully tax the system, such that differences between policies become visible. To do so, we simulate the following application behaviors: we create N overlapping objects directly in front of the user, and move each object a small amount every frame. For these experiments, we chose N objects such that the baseline would be under load—i.e., less than 60 FPS, which is considered a standard for smooth gameplay in many video games—so that we could see the effects of policies. We experimentally determined that N=500 objects would give us a baseline frame rate of less than 60 FPS.

We designed the scene such that every frame, each virtual object violates each policy we implemented (see FIG. 4) though we only activate and evaluate one policy at a time. Two of our policies required slightly different experimental setups to trigger the policy violation: P4 requires that the baseline setup repeatedly attempt to create objects each frame, and P9 requires the baseline setup to contain objects that are locked to real-world objects (in this case, billboards).

FIGS. 7A-7C show the results of these experiments. We observe a range of performance impacts across our different policies. For example, P1 (which limits the speed at which objects can move) and P2 (which makes objects too close to the user transparent) incur virtually no additional overhead over the baseline. On the other hand, P10 (which makes virtual objects that obscure other virtual objects transparent) incurs an almost 20 FPS hit. A key observation is that the complexity of object attributes directly influences policy performance. For example, P1 simply sets a threshold on objects' movement speeds, which is easily checked and enforced when an application calls object.Move( ) with a speed parameter. On the other hand, P10 incurs more overhead because it must detect virtual objects that occlude others in every frame, requiring costly raycasting operations. This lesson suggests that optimizing attribute computations and intelligently caching information will be critical for such a scheme to work in practice.

This lesson is further supported by our experience applying preliminary optimizations to P10. Initially, P0 incurred significant overhead due to redundant raycasting operations between overlapping objects, resulting in an average frame rate under 2 FPS. However, by optimizing P10 to not repeat computation on AR objects that the policy has already acted upon, we significantly improved its performance. This suggests that pursuing policy optimizations can make a big impact.

Finally, we note that P4, a policy that denies certain OnCreate( ) calls, actually improved performance over the baseline. This is a result of the baseline scene repeatedly creating and delete head-locked AR objects (objects that appear in a fixed location with respect to the display device, as opposed to in a fixed location with respect to the real-world environment), whereas P4 simply denies the requests. Thus, we observe that policies that deny object creation could also be used as a denial-of-service protection against applications attempting to create many objects.

The above benchmark provides a single snapshot of how our policies compare, with a fixed number of virtual objects (500). However, we also wish to understand (1) how policy performance scales as the number of active virtual objects that violate them increases, and (2) how performance is affected by multiple simultaneously running policies.

Figure 7D:
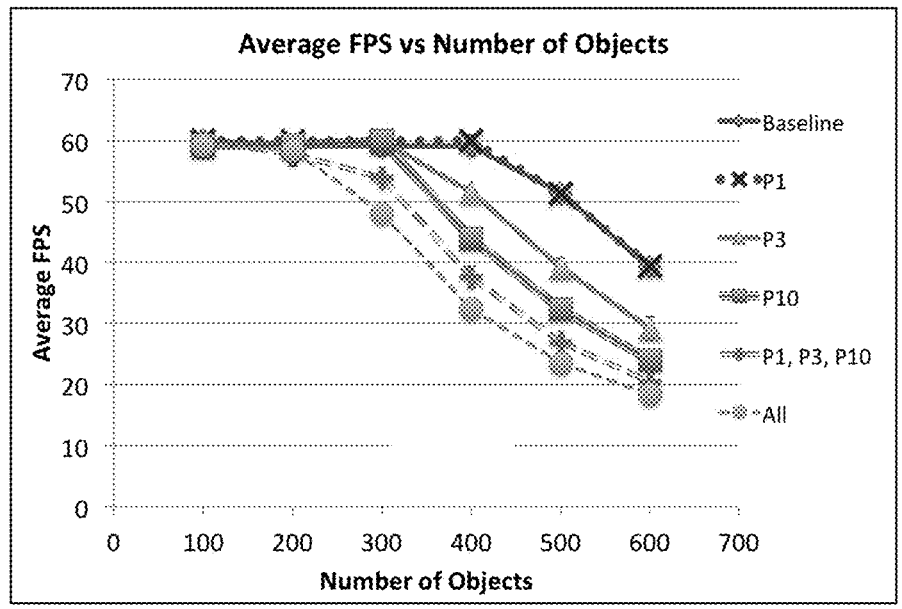

Using the same experimental setup from FIG. 7A, we compare the baseline scene to several policies, as well as combinations of policies, as we vary the number of active virtual objects present. We select the policies for this experiment based on the results in FIG. 7A, choosing our best performing policy (P1, the move policy) and two worst-performing policies (P3, the screen coverage policy and P10, the virtual object occlusion policy). FIG. 7D shows the results of this experiment. Note that we cap the maximum FPS at 60 using Unity's Application.targetFrameRate feature, 60 FPS is a standard for smooth gameplay on PC video games.

The results reveal several interesting lessons: First, policy overhead is not additive. The performance hit incurred by several policies combined, even those that leverage different attributes, is less than the sum of their overheads individually. This finding is promising, since in practice, multiple policies may indeed be active at once. Indeed, even if the list of policies increases, we expect overlapping work between policies—e.g., the cost of loading objects in memory could be amortized across multiple policies, and multiple policies may require similar computations about objects.

Second, we observe that the performance impact of additional virtual objects dominates the impact of policies. That is, as the number of virtual objects increases, the frame rate of the baseline—no policies—drops below 60 FPS, scaling with the number of objects. Although the frame rate with multiple active policies drops below 60 FPS sooner, after the initial performance hit of enforcing policies at all, the impact of multiple policies scales with number of AR objects similarly to the baseline. This is perhaps not surprising: more complex applications will run more slowly. However, the fact that the performance impact of policy enforcement does not become increasingly worse with more AR objects is promising.

Our above experiments isolate the performance impact of the output policy engine and evaluate it with respect to varying numbers of virtual objects and policies. However, we also wish to understand the impact of the output policy engine in the face of multiple real applications simultaneously running. Since our design and prototype focus was on the output policy engine, other elements of the system— specifically, its handling of multiple application threads and local socket communications—are unoptimized. To isolate the performance impacts of these unoptimized components, we first conduct a microbenchmark evaluation to profile the augmented reality platform device's application communication infrastructure. Using the results of that microbenchmark, we choose parameters for a meaningful full system evaluation such that we do not hit bottlenecks due to communication and accidentally mask the impact of the output policy engine.

We first measure the throughput of the message processing infrastructure. We connect application processes to the output policy engine over local sockets, after which the applications saturate the connections with messages, and the output policy engine then processes them as fast as it can. As we increase the number of applications, the number of messages the output policy engine can process per application decreases. This result is expected, since each application runs as a separate process, and communication between the output policy engine and each application run on separate threads.

Finally, we evaluate our full prototype: we compare performance (in FPS) with different numbers of applications, communicating over sockets, and with many active policies. As before, we design a scene in which there are multiple virtual objects, each moving once per frame, and we calculate the average FPS over a 30 second interval. We use the results of our socket microbenchmark to determine a realistic workload—i.e., a total number of virtual objects—that will avoid communication bottlenecks. We fix the total number of AR objects for this experiment at 48, evenly split across the number of running applications (1-4). Each application calls the object.Move( ) API on each of its objects approximately 30 times per second. We arrive at 48 objects based on the results from the throughput measurements: the prototype of the output policy engine can support up to about 1800 messages per second, and 48×30<1800, and it is evenly divided by 1, 2, 3, and 4 (number of applications we test). While 48 objects is much less than the 500 we used in our profiling experiments above, those experiments were specifically designed to tax the system, whereas 48 represents a more reasonable workload for applications.

Figure 7E:
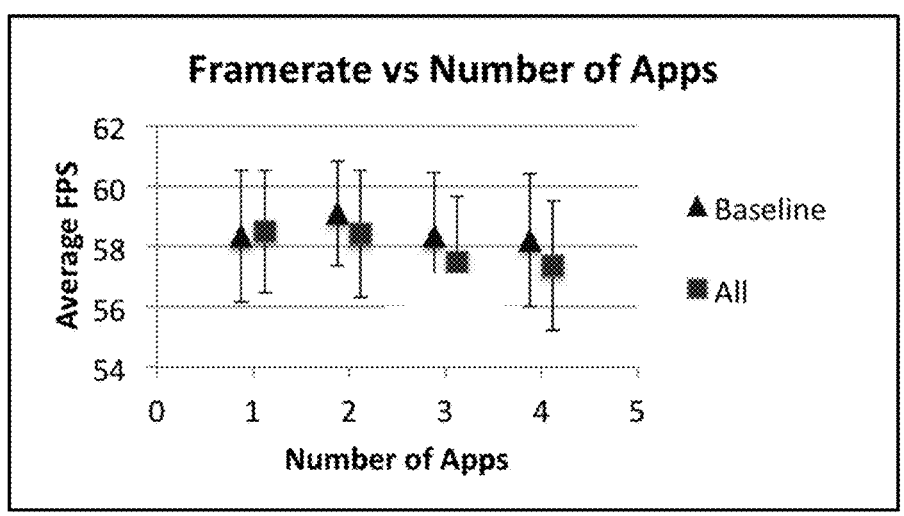

We compared this workload with all seven policies from FIG. 7A active and continuously violated to the baseline. Our results are shown in FIG. 7E. The error bars represent the standard deviation of 5 trials. The result is promising: we find that under this realistic, 48-object workload, the performance impact of policy enforcement is negligible over the baseline. Thus, whereas our earlier profiling of the output policy engine highlights bottlenecks (e.g., attributes that are expensive to compute) under load, our full system evaluation suggests that even our unoptimized prototype can handle multiple applications and multiple policies under a realistic workload.

Figure 8:
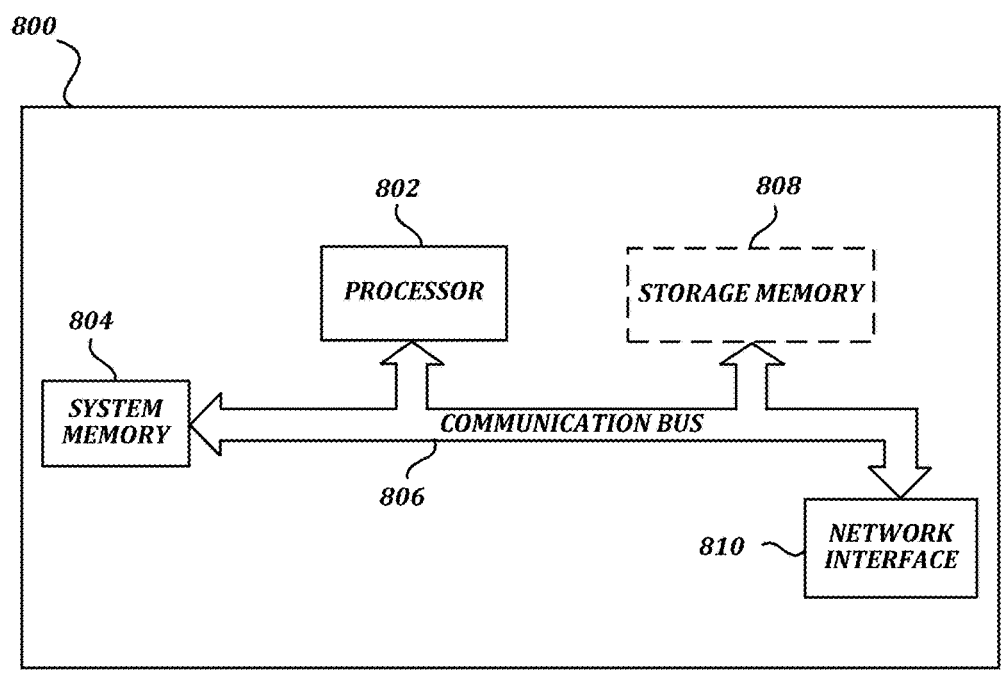
FIG. 8 is a block diagram that illustrates aspects of a computing device 800 appropriate for use as a computing device of the present disclosure.

FIG. 8 is a block diagram that illustrates aspects of a computing device 800 appropriate for use as a computing device of the present disclosure. While multiple different types of computing devices were discussed above, computing device 800 describes various elements that are common to many different types of computing devices. While FIG. 8 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. More-over, those of ordinary skill in the art and others will recognize that the computing device 800 may be any one of any number of currently available or yet to be developed devices.

In its most basic configuration, the computing device 800 includes at least one processor 802 (e.g., processing circuit) and a system memory 804 (e.g., memory) connected by a communication bus 806. Depending on the exact configuration and type of device, the system memory 804 may be volatile or nonvolatile memory, including but not limited to read only memory ("ROM"), random access memory ("RAM"), EEPROM, and flash memory. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 (e.g., communication circuit) comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, including but not limited to WiFi, 2G, 3G, LTE, WiMAX, Bluetooth, and Bluetooth low energy. As will be appreciated by one of ordinary skill in the art, the network interface 810 illustrated in FIG. 8 may represent one or more wireless interfaces or physical communication interfaces described and illustrated above with respect to particular components of the system 100.

In the embodiment depicted in FIG. 8, the computing device 800 also includes a storage medium 808. However, services may be accessed using a computing device that does not include means for persisting data to a local storage medium. Therefore, the storage medium 808 depicted in FIG. 8 is represented with a dashed line to indicate that the storage medium 808 is optional. In any event, the storage medium 808 may be volatile or nonvolatile, removable or nonremovable, implemented using any technology capable of storing information including, but not limited to, a hard drive, solid state drive, CD ROM, DVD, or other disk storage, magnetic cassettes, magnetic tape, and magnetic disk storage.

As used herein, the term "computer-readable medium" includes volatile and non-volatile and removable and non-removable media implemented in any method or technology capable of storing information, such as computer readable instructions, data structures, program modules, or other data. In this regard, the system memory 804 and storage medium 808 depicted in FIG. 8 are merely examples of computer-readable media.

Suitable implementations of computing devices that include a processor 802, system memory 804, communication bus 806, storage medium 808, and network interface 810 are known and commercially available. For ease of illustration and because it is not important for an understanding of the claimed subject matter, FIG. 8 does not show some of the typical components of many computing devices. In this regard, the computing device 800 may include input devices, such as a keyboard, keypad, mouse, microphone, touch input device, touch screen, tablet, and/or the like. Such input devices may be coupled to the computing device 800 by wired or wireless connections including RF, infrared, The embodiments of the invention in which an exclusive property or privilege is claimed are defined as follows:

1. A system for providing an augmented reality presentation, the system comprising:
   at least one augmented reality presentation device; and
   an augmented reality platform device having at least one processor, wherein the augmented reality platform device is configured to process a request to present a virtual object by:
   using one or more policies to evaluate the request to present the virtual object;
   in response to determining that no policies are violated, presenting the virtual object using the at least one augmented reality presentation device; and
   in response to determining that the one or more policies are violated:
      altering a state of the virtual object to comply with the one or more violated policies; and
      selectively rendering the altered virtual object using the at least one augmented reality display device;
   wherein the one or more policies that are violated include a first policy and a second policy;
   wherein the first policy includes a first enforcement action that specifies a first state threshold value for the state;
   wherein the second policy includes a second enforcement action that specifies a second state threshold value for the state; and
   wherein altering the state of the virtual object to comply with the one or more violated policies includes:
      altering a threshold for the state based on the first state threshold value;
      comparing the threshold to the second state threshold value;
      further altering the threshold based on the second state threshold value in response to determining that the second state threshold value reduces intrusiveness more than the threshold, or retaining the threshold based on the first state threshold value in response to determining that the second state threshold value does not reduce intrusiveness more than the threshold; and
      altering the state of the virtual object based on the threshold.

2. The system of claim 1, further comprising at least one environmental sensor, wherein the augmented reality platform device is further configured to process data generated by the at least one environmental sensor to detect real-world objects; and
   wherein using the one or more policies to evaluate the request to present the virtual object includes comparing a presentation location of the virtual object to a location of a detected real-world object.

3. The system of claim 2, wherein the detected real-world object is a human, an animal, a bicycle, a billboard, a vehicle, a road sign, an emergency exit sign, an automatic external defibrillator (AED) sign, a fire extinguisher, a surface discontinuity, a hot surface, an alarm, a smell of smoke, or a smell of natural gas.

4. The system of claim 2, wherein the one or more policies include determining whether presentation of the virtual object would obscure the detected real-world object.

5. The system of claim 1, wherein the one or more policies include determining whether presentation of the virtual object would cause an apparent velocity of the virtual object to violate a predetermined threshold apparent velocity.

6. The system of claim 1, wherein the at least one augmented reality presentation device is associated with a windshield of a vehicle or a head-mounted display device.

7. The system of claim 1, wherein altering the state of the virtual object includes at least one of changing an opacity of the virtual object, changing a presentation location of the virtual object, changing an apparent velocity of the virtual object, changing an apparent size of the virtual object, changing a sound level of the virtual object, and preventing presentation of the virtual object.

8. The system of claim 1, wherein processing the request to render the virtual object includes receiving an application programming interface (API) call or executing a frame rendering loop.

9. The system of claim 1, wherein the evaluating of the request is performed by a kernel-mode component of an operating system of the augmented reality platform device, and the request is received from an application outside of the operating system.

* * * * *